United States Patent [19]

Mochida et al.

[11] Patent Number: 5,609,800
[45] Date of Patent: Mar. 11, 1997

[54] PROCESS FOR PRODUCING HIGH-DENSITY AND HIGH-STRENGTH CARBON ARTIFACTS SHOWING A FINE MOSAIC TEXTURE OF OPTICAL ANISOTROPY

[75] Inventors: Isao Mochida, Fukuoka-ken; Ryuji Fujiura, Ibaraki-ken; Takashi Kojima, Ibaraki-ken; Hitoshi Sakamoto, Ibaraki-ken, all of Japan

[73] Assignee: Mitsubishi Gas Chemical Company, Inc., Japan

[21] Appl. No.: 529,439

[22] Filed: Sep. 18, 1995

Related U.S. Application Data

[62] Division of Ser. No. 350,679, Dec. 7, 1994, Pat. No. 5,484,520.

[30] Foreign Application Priority Data

Dec. 9, 1993 [JP] Japan .......................................... 30982
Dec. 16, 1993 [JP] Japan ........................................ 316767

[51] Int. Cl.$^6$ .................................................. C01B 31/02
[52] U.S. Cl. ...................... 264/29.6; 264/1.21; 264/29.7
[58] Field of Search ............................... 264/29.6, 29.7, 264/1.21

[56] References Cited

U.S. PATENT DOCUMENTS

| | | | |
|---|---|---|---|
| 3,956,436 | 5/1976 | Honda et al. | 264/29 |
| 4,293,533 | 10/1981 | Asano et al. | 423/449 |
| 4,637,906 | 1/1987 | Fukuda et al. | 264/29.1 |
| 4,789,455 | 12/1988 | Mochida et al. | 208/39 |
| 4,891,128 | 1/1990 | Mochida et al. | 208/39 |

FOREIGN PATENT DOCUMENTS

| | | |
|---|---|---|
| 157560 | 10/1985 | European Pat. Off. . |
| 283211 | 9/1988 | European Pat. Off. . |
| 0575748 | 12/1993 | European Pat. Off. . |
| 59-58284 | 12/1983 | Japan . |
| 1-58124 | 9/1984 | Japan . |
| 63-146920 | 6/1988 | Japan . |
| 1-139621 | 6/1989 | Japan . |
| 1-239058 | 9/1989 | Japan . |
| 1-254796 | 10/1989 | Japan . |
| 03170314 | 7/1991 | Japan . |
| 364448 | 10/1991 | Japan . |
| 1324124 | 7/1973 | United Kingdom . |

OTHER PUBLICATIONS

International Symposium on Carbon, Toyohashi, Extended Abstract, p. 196 Carbon, vol. 28, 1990, p. 559 and p. 143, "Viscous Flow of Black Carbon . . . "1990 (no month avail.).
Tanso No. 155, p. 370, 1992 "Preparation, Structure and Application of Mesophase Patches . . . "1992 (no month avail.).

Primary Examiner—Donald E. Czaja
Assistant Examiner—Sean Vincent
Attorney, Agent, or Firm—Roylance, Abrams, Berdo & Goodman, L.L.P.

[57] ABSTRACT

Self-adhesive carbonaceous grains for use in the manufacture of high-density and high-strength carbon artifacts containing 0.5–1.5 wt % of a quinoline-soluble but pyridine-insoluble component and at least 97 wt % of a quinoline-insoluble component and which are prepared by heat-treating in a nonoxidizing atmosphere a mesophase pitch that is obtained by polymerizing condensed polycyclic hydrocarbons or substances containing them in the presence of a superacid consisting of hydrogen fluoride and boron trifluoride. The carbonaceous grains are molded and the mold is baked at a sufficient temperature to achieve its carbonization, with the heating rate being not more than 20° C./h in the temperature range from 400° to 600° C. In this way, high-density and high-strength carbon artifacts showing a homogeneous fine mosaic texture of optical anisotropy can be efficiently manufactured in high carbon yield.

6 Claims, 2 Drawing Sheets

20μm

PROCESS FOR PRODUCING HIGH-DENSITY AND HIGH-STRENGTH CARBON ARTIFACTS SHOWING A FINE MOSAIC TEXTURE OF OPTICAL ANISOTROPY

This is a division of application Ser. No. 08/350,679 filed Dec. 7, 1994 now U.S. Pat. No. 5,484,520.

BACKGROUND OF THE INVENTION

1. Field of the Invention

This invention relates to self-adhesive carbonaceous grains suitable for the manufacture of high-density and high-strength carbon artifacts. The invention also relates to a process for producing high-density and high-strength carbon artifacts showing a fine mosaic texture of optical anisotropy from self-adhesive carbonaceous grains. More particularly, the invention relates to a process for producing high-density and high-strength carbon artifacts characterized by random arrangement of optically anisotropic units at the submicron level.

2. Prior Art

Many approaches have heretofore been known in the manufacture of high-density carbon artifacts. They are generally produced by mixing fillers such as pulverized coke, natural graphite and carbon black with binders such as coal-tar pitch, molding the mixture and baking the mold. The carbonization yield of the conventional binder is very low and the density of the mold achieved by single carbonization is accordingly very low; therefore, the steps of impregnation and carbonization must be repeated until the desired properties are attained. As a further problem, the major lightweight components of the binder will evaporate during the carbonization to form pores that remain in the mold; such pores will introduce inhomogeneity in the mold. Additionally, structure disruption may be caused by the bloating of the binder. To avoid these adverse effects, the carbonization step must be performed by heating at an extremely slow rate but then this increases the time schedule of carbon artifact production to at least 3–4 weeks. The carbonized mold may be graphitized by further heating at 2500°–3000° C., depending on the use of the final product. Besides, a period of 2–3 weeks is required to perform this step of graphitization. In total, a period as long as 2–3 months is taken to manufacture graphitic artifacts prepared from fillers (e.g. coke) and binders (e.g. coal-tar pitch) through the above-described complex route.

As the demand for improvements in the performance of specialty carbon artifacts and composites is growing year by year, controlling the structure and texture of carbon is extremely important for the purpose of enhancing the performance of the final product since the physicochemical characteristics of the product significantly depend on the structure and texture of carbon. In the field of specialty carbon artifacts, many R&D efforts have been made to control the shape and size of starting grains so that the carbon artifacts will exhibit fine mosaic texture, thereby achieving not only higher density and strength but also physical isotropy.

A method is known to attain physical isotropy of the artifact by using mesocarbon microbeads as a starting material. In this method, the optically anisotropic small spheres that form in the process of heat treatment of coal-tar, petroleum-derived heavy oils, etc. at temperatures of 350°–500° C. are solvent-extracted from the pitch matrix, dried, molded under pressure and baked. However, as pointed out in Unexamined Published Japanese Patent Application (KOKAI) No. Hei 1-239058, the size of optical unit of the carbon artifact produced by that method is not smaller than the particle size of mesophase spheres (10–20 μm) and it is impossible to decrease the size of optical unit. A further problem with the method is that an extremely large quantity of extraction solvent is required in the step of separating the spheres. In addition, it is difficult to remove the remaining solvent completely from the recovered spherical grains and this can be a cause of cracking or expansion of the mold in the subsequent carbonization step. Further, in addition to the extremely low yield of the spheres obtained by solvent extraction, it is difficult to control their properties. In other words, this method is not feasible since it is not easy to prepare mesocarbon microbeads of acceptable quality and price on an industrial scale.

Another method is concerned with the grains of a pulverized bulk mesophase of specified properties as a starting material (see Examined Japanese Patent Publication (KOKOKU) No. Hei 1-58124). However, the carbon artifacts produced from the pulverized bulk mesophase show low bulk density, and no satisfactory performance has been achieved. As a further problem, the bulk mesophase, which is obtained by coalescing and agglomerating mesocarbon microbeads, has to be separated from the pitch matrix and many complex processing steps are required to obtain a bulk mesophase of specified properties. It has also been pointed out in Unexamined Published Japanese Patent Application (KOKAI) No. Hei 1-239058, supra, that the size of optically anisotropic unit derived from pulverized bulk mesophase in the mold cannot become smaller than that achieved by pulverization.

Many cases of the attempt to use particular grains that are preliminarily modified to exhibit a fine mosaic texture have also been reported. For example, Examined Japanese Patent Publication (KOKOKU) No. Sho 58-58284 teaches a method in which semi-coke with a mosaic texture composed of extremely fine optical units ($\leq 1$ μm) is used as a molding feed. However, this method involves a complex process including solvent-extraction of the feed coal in the presence of hydrogen gas, separation of the extract, followed by heat treatment. Examined Japanese Patent Publication (KOKOKU) No. Hei 3-6448 teaches a method of adding carbon black to pitch, and Unexamined Published Japanese Patent Application (KOKAI) No. Hei 1-239058, supra, teaches a process for producing an isotropic graphite artifact having a homogeneous mosaic texture by the steps of incorporating a resin in pitch, pulverizing the mixture, molding the grains in the absence of a binder, and baking the mold. However, both methods have the disadvantage of involving a complex procedure comprising mixing, kneading and re-pulverization. In addition, the carbon artifacts produced by these methods exhibit low bulk density, and no satisfactory performance has been attained.

Extensive studies have also been conducted in the area of carbon composites. For instance, International Symposium on Carbon, Toyohashi, Extended Abstract, p.196, 1982 reported the superiority of matrix carbon showing a fine mosaic texture as regards the development of excellent thermal shock resistance and high mechanical strength; CARBON, vol. 28, 1990 reports a pitch/phenolic resin system (p.559) and a pitch/carbon black system (p.143), together with their interaction and carbonization properties.

As will be understood from the foregoing discussion, the manufacture of high-density carbon artifacts involves extremely complex and time-consuming processes and, hence, the products of the conventional methods are expensive enough to substantially limit the scope of their industrial applicability. Under the circumstances, one major goal in carbon industry in connection with the manufacture of high-density carbon artifacts is substantial simplification of the production process while shortening the time required for their production. As for the control of carbon texture which is the key factor to the enhancement of product performance and structural homogenization, the conventional processes have had various drawbacks as described hereinabove.

The present inventors previously found that self-adhesive carbonaceous grains suitable for the manufacture of high-density carbon artifacts could be prepared from a specified mesophase pitch and that this could be used as a means to solve the aforementioned problems of the prior art. The inventors formulated their finding in a patent application, which was filed in the United States of America as U.S. Ser. No. 08/063,421. This prior application teaches that self-adhesive carbonaceous grains defined in terms of H/C and O/C values have outstanding performance. However, the application makes no reference to the quinoline-soluble and pyridine-insoluble component or the quinoline-insoluble component of the carbonaceous grains, nor does it teach that carbon artifacts derived from said carbonaceous grains are characterized by random orientation of optically anisotropic units at the submicron level.

SUMMARY OF THE INVENTION

An objective, therefore, of the present invention is to provide self-adhesive carbonaceous grains from which high-density and high-strength carbon artifacts can be manufactured at low cost in a short time.

Another objective of the invention is to provide a process by which high-performance carbon artifacts exhibiting a fine mosaic texture of optical anisotropy can be produced from said carbonaceous grains in a simple, economical and consistent way.

With a view to attaining these objectives, the present inventors conducted intensive studies and found the following: first, thermally modified pitch grains consisting of a quinoline-soluble but pyridine-insoluble component and a quinoline-insoluble component in amounts of specified ranges which were prepared by the heat treatment of a mesophase pitch that was obtained by polymerizing a condensed polycyclic hydrocarbon or a substance containing the same in the presence of hydrogen fluoride/boron trifluoride could be molded without using a binder, and the grains in their mold maintained its shape in the process of carbonization, exhibiting high carbon and fusibility for adhesion yield; secondly, by proper control of the rate of heat elevation at which the molded part of the thermally modified mesophase pitch grains was heated in the early stage of carbonization, high-density and high-strength carbon artifacts exhibiting a homogeneous, fine mosaic texture could be produced in a short time and in a consistent and economical way. The present invention has been accomplished on the basis of these findings.

Therefore, in its first aspect, the present invention relates to self-adhesive carbonaceous grains that contain 0.5–1.5 wt % of a quinoline-soluble but pyridine-insoluble component and at least 97 wt % of a quinoline-insoluble component and which are prepared by the heat treatment in a nonoxidizing atmosphere of a mesophase pitch that is obtained by polymerizing a condensed polycyclic hydrocarbon or a substance containing the same in the presence of hydrogen fluoride/boron trifluoride.

In its second aspect, the present invention provides a process for producing a carbon artifact exhibiting a fine mosaic texture by the steps of molding the above-described self-adhesive carbonaceous grains under pressure and baking the mold in a nonoxidizing atmosphere at a sufficient temperature to achieve its carbonization or graphitization, with the carbonization rate being not more than 20° C./h in the temperature range from 400° to 600° C.

DETAILED DESCRIPTION OF THE INVENTION

Figure 1:
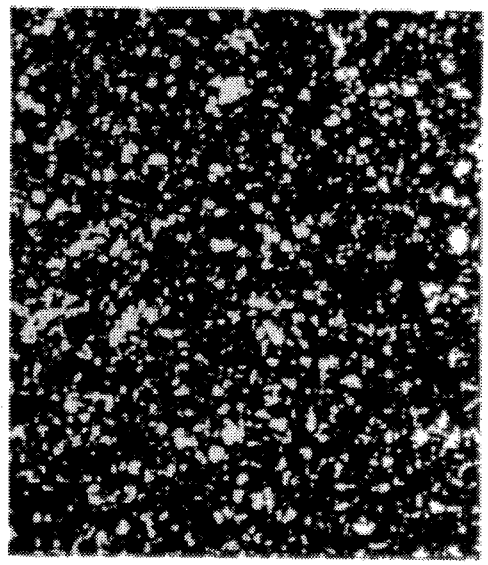
FIG. 1 is an optical micrograph of the carbonized product as obtained in Example 2.

The precursor of the self-adhesive carbonaceous grains is a mesophase pitch that is obtained by polymerizing a condensed polycyclic hydrocarbon or a substance containing the same in the presence of a superacid consisting of hydrogen fluoride and boron trifluoride. The precursor mesophase pitch is described in Unexamined Published Japanese Patent Application (KOKAI) Nos. Sho 63-146920, Hei 1-139621 and Hei 1-254796 and it can be prepared by polymerizing a condensed polycyclic hydrocarbon such as naphthalene, methylnaphthalene, anthracene, phenanthrene, acenaphthene, acenaphthylene or pyrene or a substance containing the same in the presence of a superacid catalyst consisting of hydrogen fluoride and boron trifluoride.

Hydrogen fluoride, when present in combination with boron trifluoride, forms a strong protonic acid which, in turn, forms a complex with the basic condensed polycyclic hydrocarbon. Hydrogen fluoride also works as a solvent and the resulting complex dissolves in excess hydrogen fluoride to form a complex solution. The polymerization reaction will proceed very smoothly in this hydrogen fluoride solution under mild conditions. Thus, hydrogen fluoride used in an excess amount functions primarily as a catalyst by equally important is its function as a reaction medium.

In the preparation of mesophase pitch using the superacid polymerization catalyst which consists of hydrogen fluoride and boron trifluoride, the properties of the mesophase pitch to be prepared can be controlled by proper selection of the polymerization conditions including the reaction time and temperature, the molar ratio between the condensed polycyclic hydrocarbon feed, hydrogen fluoride and boron trifluoride, and the type of condensed polycyclic hydrocarbon to be used. Normally, naphthalene is used as the starting monomer and subjected to the polymerization reaction at 200°–300° C. for several hours. Since the catalyst consisting of hydrogen fluoride and boron trifluoride has a very low boiling point, it can be completely separated from the resulting pitch and, hence, the mesophase pitch obtained exhibit an extremely high chemical purity.

The mesophase pitch under discussion is obtained by cationic polymerization in the substantial absence of the occurrence of dehydrogenation and, hence, its structure is characterized by high content of naphthenic hydrogen and aliphatic hydrogen (see TANSO, No. 155, p.370, 1992). In other words, the mesophase pitch to be used as a precursor in the present invention for producing self-adhesive carbonaceous grains is clearly distinguishable in structure not only from the conventional coal- or petroleum-derived mesophase pitches which are prepared by thermal polycondensation of coal tar and petroleum residues which are by-products in the coal or petrochemical processes but also from the bulk mesophase that is described in Examined Japanese Patent Publication (KOKOKU) No. Hei 1-58124, supra.

The self-adhesive carbonaceous grains according to the first aspect of the invention are produced by heat-treating the above-described mesophase pitch in a nonoxidizing atmosphere such as a nitrogen atmosphere. The conditions of the heat treatment are not limited in any particular way but the mesophase pitch is generally heat-treated at temperatures in the range from 420° to 590° C. It is essential for the purposes of the present invention that the conditions of the heat treatment be so selected as to form 0.5–1.5 wt %, preferably 0.7–1.3 wt %, of a quinoline-soluble but pyridine-insoluble component and at least 97 wt %, preferably at least 98 wt %, of a quinoline-insoluble component.

For quantitation of the respective components, pyridine-dependent fractionation is performed by Soxhlet extraction whereas quinoline-dependent fractionation is performed by centrifugation in accordance with JIS K2425.

In the first aspect of the invention, it is by thermally modifying the mesophase pitch of interest so as to contain 0.5–1.5 wt % of a quinoline-soluble but pyridine-insoluble component and at least 97 wt % of a quinoline-insoluble component that excellent molding property is assured for the carbonaceous grains while high-density and high-strength carbon artifacts can be manufactured without inducing cracking or bloating in the step of carbonization.

Stated more specifically, if the quinoline-soluble and pyridine-insoluble component which corresponds to the binder component in the thermally modified pitch and the quinoline-insoluble component which guarantees high carbonization yields are adjusted to lie within the above-mentioned ranges by controlled heat treatment, the following characteristics will develop in the carbonaceous grains, which make them suitable as the starting material for the manufacture of carbon artifacts. First, they will deform appropriately at room temperature under pressure and, hence, they can be packed tightly, exhibiting excellent molding property even at room temperature. The mold of the carbonaceous grains has a sufficient strength to reasonably withstand ordinary handling even if it is yet to be baked. Furthermore, in the early stage of carbonization, the carbonaceous grains in their mold maintain its shape and yet they show an appropriate degree of fusibility for adhesion; therefore, the individual grains in the mold will adhere to each other very strongly to provide a fine mosaic texture, thereby achieving high density and strength. In addition, the carbonaceous grains under discussion contain at least 97 wt % of the quinoline-insoluble component, so the yield of their carbonization is extremely high and there will be little formation of pores due to the evolution of volatile matters in the process of carbonization. Consequently, as will be demonstrated later in the Examples of the invention, the mold thus prepared shows high density and strength together with homogeneous and dense structure.

If the content of the quinoline-soluble and pyridine-insoluble component which corresponds to the binder component of the thermally modified pitch exceeds 1.5 wt %, the carbonaceous grains in the mold exhibit excessive fusibility in the early stage of carbonization, forming a flow texture where many shrinkage cracks are induced in the later stage of carbonization. The further increase in the content of the quinoline-soluble and pyridine-insoluble component may cause deformation or expansion of the mold. It should also be noted that the content of the quinoline-soluble and pyridine-insoluble component is complementary to the content of the quinoline-insoluble component and that, therefore, if the former exceeds 1.5 wt %, the latter becomes lower than 97 wt %, resulting in the decrease in carbonization yield. Consequently, more volatile matters are prone to evolve, thereby increasing the number of pores that form in the carbonized mold. Thus, carbonaceous grains containing more than 1.5 wt % of the quinoline-soluble but pyridine-insoluble component will produce an artifact with so many cracks and pores, which shows low bulk density and mechanical strength (see Comparative Example 1 which follows).

If the content of the quinoline-soluble and pyridine-insoluble component is less than 0.5 wt %, the carbonaceous grains in their mold will exhibit insufficiently fusibility in the early stage of carbonization, decreasing the force of adhesion among grains. Consequently, many voids will form when the individual grains shrink in the later stage of carbonization and, what is more, cracks are prone to occur within the regions where optical unit is comparatively large. The resultant mold will show inhomogeneous texture in which there are many voids and cracks, and its bulk density and mechanical strength (see Comparative Example 2 that follows) will decrease.

If the mesophase pitch of interest is thermally modified in such a way that the contents of the quinoline-soluble but pyridine-insoluble component and the quinoline-insoluble component are within the stated ranges, the resultant grains exhibit outstanding self-adhesive property, molding property, and higher carbonization yield. Therefore, high-density and high-strength carbon artifacts showing a homogeneous and dense texture can be efficiently manufactured even if baking treatment is carried out only once.

In accordance with the second aspect of the invention, there is provided a process for producing a high-density and high-strength carbon artifact from the carbonaceous grains described hereinabove. The process starts with pulverizing the mesophase pitch that has been heat-treated to satisfy the requirements also described above. The method of pulverizing the mesophase pitch and the shape of the grains thus produced are not limited in any particular way. The grain size distribution also is not limited to any particular value but it is preferably such that the grains can be molded at the highest possible packing density. For molding purposes, carbonaceous grains of 1–200 µm are typically used, with those of 1–20 µm being particularly preferred.

In the next step, the grains of thermally modified mesophase pitch are molded under pressure, preferably by isostatic pressing. There is no particular need to use a binder in the molding step. The shape of the mold is not limited in any way and can be freely selected depending upon such factors as the object and use of the final product. Molding may be performed either at room temperature or in such a temperature range that the thermally modified grains will soften or melt. The selection of a suitable temperature depends on the required shape, performance and cost of the final product.

The mold is subsequently baked to produce the desired carbon artifact. The baking temperature for carbonization is generally in the range from 600° to 1700° C. The carbonized mold thus obtained may be graphitized at 1700°–3000° C. if required. In other words, the carbon artifacts to be produced in accordance with the second aspect of the invention include two types, one being produced by carbonization at 600°–1700° C. and the other being produced by graphitization at 1700°–3000° C.

In order to obtain the carbon artifacts exhibiting a fine mosaic texture after baking, it is extremely important that the green mold consisting of the self-adhesive carbonaceous grains according to the first aspect of the invention be baked in such a way that the rate of temperature elevation in the early stage of carbonization from 400° up to 600° C. is no more than 20° C./h, preferably between 5° and 15° C./h.

By adopting such a heating profile, the domain texture of the unbaked grains can be modified, upon baking, to a homogeneous and fine mosaic texture in which optically anisotropic units are randomly oriented at the submicron level. The thus formed texture is very small in the size of the optically anisotropic unit. Hence, the development and propagation of cracks in the process of graphitization are effectively inhibited. Thereby producing carbon artifacts that are further advanced in performance and which are rendered isotropic in physical properties.

If the rate of temperature elevation in the early stage of the carbonization (400°–600° C.) of the green mold is faster than 20° C./h, no fine mosaic structure will form and the greater part of the mold will show a coarse and inhomogeneous texture composed of optically anisotropic units whose size is much the same to that of the unbaked grains in their mold. If further heating is done to achieve graphitization, many cracks will be induced and the desired optical texture cannot be obtained.

SPECIFIC EXAMPLES OF THE INVENTION

The following examples are provided for the purpose of further illustrating the present invention but are in no way to be taken as limiting. The carbon artifacts prepared in Example 2 and Comparative Example 3 are shown in optical micrographs in FIGS. 1–4, for which the magnification was fixed at X400.

Example 1

Naphthalene (7.0 mol), hydrogen fluoride (3.7 mol) and boron trifluoride (1.05 mol) were charged into a 3-L acid-resistant autoclave and subjected to reaction at 265° C. for 4 h with the pressure kept at 27 kgf/cm$^2$. The release valve on the autoclave was then opened to recover substantially all quantities of hydrogen fluoride and boron trifluoride in the gaseous state under atmospheric pressure. Thereafter, nitrogen was blown into the autoclave to remove the low-boiling components, producing a mesophase pitch in a yield of 75 wt % (relative to the naphthalene feed). The pitch was wholly composed of an optically anisotropic phase; it had a softening point of 240° C. with a H/C atomic ratio of 0.65.

The temperature of the thus synthesized mesophase pitch was raised up to 480° C. in a nitrogen atmosphere at a rate of 300° C./h and a heat treatment was subsequently conducted at that temperature for 1 h to produce a homogeneous, thermally modified pitch. The pitch contained 1.3 wt % of a quinoline-soluble but pyridine-insoluble component and 98.1 wt % of a quinoline-insoluble component. The pitch was pulverized with a ball mill to grains having an average size of 6 μm; the grains were molded into a plate (35 mm×40 mm×10 mm) under pressure of 1.5 tf/cm$^2$ at room temperature. The plate was heated in a flow of argon with the temperature being raised from 400° C. to 600° C. at a rate of 20° C./h; after holding at 600° C. for 1 h, the temperature was raised to 1200° C., at which the plate was held for 2 h. The resulting carbonization yield was 93.2%. The carbonized product was further graphitized at 2000° C. for 2 h. The carbonized product and the graphitized product showed the physical properties shown in Table 1 below.

Comparative Example 1

A mesophase pitch of the same characteristics as in Example 1 was heat-treated at 465° C. for 1 h to produce a homogeneous, thermally modified pitch. The pitch contained 1.8 wt % of a quinoline-soluble but pyridine-insoluble component and 96.4 wt % of a quinoline-insoluble component. The mold of the pitch grains was then baked under the same conditions as in Example 1. Because of the excessive content of the quinoline-soluble and pyridine-insoluble component in the thermally modified pitch, the resultant artifact did not exhibit any high performance as demonstrated in Table 1.

Comparative Example 2

A mesophase pitch of the same characteristics as in Example 1 was heat-treated at 500° C. for 1 h to produce a homogeneous, thermally modified pitch. The pitch contained 0.1 wt % of a quinoline-soluble but pyridine-insoluble component and 99.8 wt % of a quinoline-insoluble component. The mold of the pitch grains was baked by the same procedure as in Example 1. Because of the insufficiency of the quinoline-soluble but pyridine-insoluble component in the thermally modified pitch, the resultant artifact did not show any high performance as demonstrated in Table 1.

TABLE 1

| | Calcination temperature, °C. | Bulk density, g/cm$^3$ | Compressive strength, kgf/mm$^2$ | Flexural strength, kgf/mm$^2$ |
| --- | --- | --- | --- | --- |
| Ex. 1 | 1200 | 1.88 | 29.5 | 14.3 |
| | 2000 | 2.05 | 24.5 | 12.8 |
| Comp. Ex. 1 | 1200 | 1.80 | 13.4 | 5.7 |
| | 2000 | 1.90 | 8.2 | 3.3 |
| Comp. Ex. 2 | 1200 | 1.70 | 12.0 | 5.2 |
| | 2000 | 1.77 | 8.0 | 3.2 |

Example 2

Naphthalene (7.0 ml), hydrogen fluoride (2.4 mol) and boron trifluorine (0.74 mol) were charged into a 3-L acid-resisting autoclave and subjected to reaction at 290° C. for 4 h with the pressure kept at 25 kg/cm$^2$. The release valve on the autoclave was then opened to recover substantially all quantities of hydrogen fluoride and boron trifluoride in the gaseous state under atmospheric pressure. Thereafter, nitrogen was blown into the autoclave to remove the low-boiling components, producing a mesophase pitch in a yield of 70 wt % (relative to the naphthalene feed). The pitch had a softening point of 250° C., with an optically anisotropic phase content of 100% and a H/C atomic ratio of 0.60; the carbonization yield was 87 wt %.

The thus synthesized mesophase pitch was heat-treated at 480° C. for 1 h in a nitrogen atmosphere to produce a homogeneous, thermally modified pitch. The pitch contained 1.0 wt % of a quinoline-soluble but pyridine-insoluble component and 98.5 wt % of a quinoline-insoluble component. The pitch was pulverized to grains having an average size of 7 μm; the grains were molded into a plate (35 mm×40 mm×10 mm) under pressure of 1.5 tf/cm² at room temperature. The green plate was heated in a flow of nitrogen, with the temperature being raised from room temperature to 400° C. at a rate of 300° C./h and from 400° C. to 600° C. at a rate of 12° C./h; thereafter, the plate was held at 600° C. for 2 h.

The carbonized product thus obtained was mounted in a resin and polished for examination under an optical microscope. As shown in FIG. 1, the carbonized product exhibited a homogeneous and fine mosaic texture characterized by random orientation of anisotropic units at the submicron level. The carbonized product showed a bulk density of 1.35 g/cm³, a compressive strength of 15.6 kgf/mm², and a flexural strength of 7.8 kgf/mm².

Figure 2:
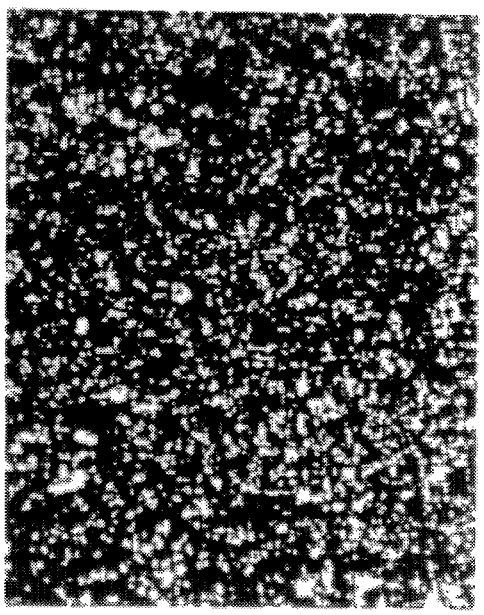
FIG. 2 is an optical micrograph of the graphitized product as obtained in Example 2.

The carbonized product was further heated in a flow of argon, with the temperature raised up to 1900° C. at a rate of 300° C./h, and held at 1900° C. for 2 h to be graphitized. As shown in FIG. 2, the optical texture of the graphitized product was even more homogeneous than that of the carbonized product, and the size of optical units became much smaller. No crack was observable in the graphitized product. It exhibited a bulk density of 2.04 g/cm³, a compressive strength of 25.7 kgf/mm², and a flexural strength of 13.7 kgf/mm².

Comparative Example 3

Figure 3:
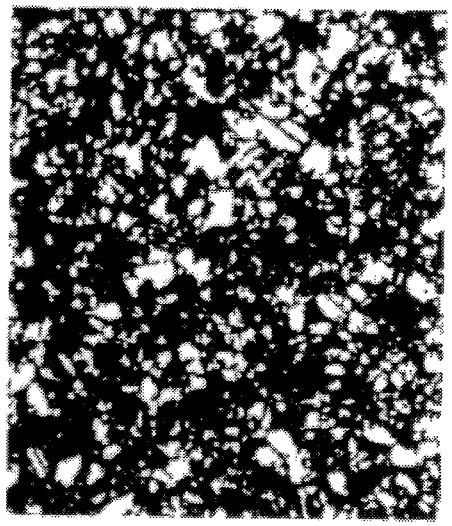
FIG. 3 is an optical micrograph of the carbonized product as obtained in Comparative Example 3.

Thermally modified mesophase pitch of the same characteristics as in Example 2 were molded into a plate under the same conditions as in Example 2. The green plate was heated from room temperature up to 600° C. at a rate of 300° C./h and held at 600° C. for 2 h. The thus carbonized plate exhibited the inhomogeneous texture as shown in FIG. 3; obviously, the size of optical units was large, retaining the size of as-pulverized grains in many regions. The carbonized product showed a bulk density of 1.32 g/cm³, a compressive strength of 12.9 kgf/mm² and a flexural strength of 6.0 kgf/mm².

Figure 4:
FIG. 4 is an optical micrograph of the graphitized as obtained in Comparative Example 3.

The carbonized plate was further heated to 1900° C. in a flow of argon, with the temperature raised at a rate of 300° C./h, and held at 1900° C. for 2 h to be graphitized. As shown in FIG. 4, the optical texture of the graphitized product was inhomogeneous. Cracks were detectable in some particular regions where optical unit was relatively large. The graphitized product showed a bulk density of 1.97 g/cm³, a compressive strength of 14.3 kgf/mm², and a flexural strength of 5.9 kgf/mm².

ADVANTAGES OF THE INVENTION

The carbonaceous grains of the present invention has many desirable properties such as excellent deformability under pressure at room temperature, shape stability after molding, appropriate fusibility for adhesion in the early stage of carbonization, good graphitizability, and extremely high carbon yield. Because of these properties, the grains will exhibit particularly excellent performance when used as a single starting material for the manufacture of high-density and high-strength carbon artifacts. The carbon and graphite artifacts derived from the precursor mesophase pitch not only exhibit an optically anisotropic texture but also possess a dense, homogeneous and chemically pure structure, thus forming very strong carbon bonds. The strength of such carbon bonds is further increased by baking at higher temperature; since the degree of graphitization is increased and densification is further enhanced by shrinkage during baking. The carbonaceous grains of the invention which are prepared by thermally modifying the mesophase pitch to an appropriate extend exhibit self-adhesive property and need no binder. Therefore, carbon artifacts having a homogeneous and fine mosaic texture of optical anisotropy can be efficiently produced from those carbonaceous grains by controlling the heating rate at which temperature is raised in the early stage of carbonization of the mold. Since this contributes to the achievement of isotropic mechanical properties and improvement in performance, high-density and high-strength carbon artifacts can be manufactured in a short time in an efficient and economical way.

What is claimed is:

1. A process for producing a carbon artifact showing a fine mosaic texture of optical anisotropy by the steps of molding self-adhesive carbonaceous grains into a predetermined shape under pressure and baking the mold in a nonoxidizing atmosphere at a sufficient temperature to achieve carbonization or graphitization of said mold, with the heating rate being not more than 20° C./h in the temperature range from 400° to 600° C., said self-adhesive carbonaceous grains containing 0.5–1.5 wt % of a quinoline-soluble but pyridine-insoluble component and at least 97 wt % of a quinoline-insoluble component and being prepared by the heat treatment in a nonoxidizing atmosphere of a mesophase pitch that is obtained by polymerizing a condensed polycyclic hydrocarbon or a substance containing the same in the presence of hydrogen fluoride and boron trifluoride.

2. A process according to claim 1 wherein the heating rate is 5°–15° C./h.

3. A process according to claim 1 wherein the nonoxidizing atmosphere for the baking step is argon.

4. A process according to claim 1 wherein the baking temperature is from 600° to 3000° C.

5. A process according to claim 1 wherein the carbonaceous grains have an average size of 1–200 μm.

6. A process according to claim 5 wherein the average grain size is 1–20 μm.

* * * * *

UNITED STATES PATENT AND TRADEMARK OFFICE
CERTIFICATE OF CORRECTION

PATENT NO. : 5,609,800
DATED : March 11, 1997
INVENTOR(S) : MOCHIDA et al.

It is certified that error appears in the above-indentified patent and that said Letters Patent is hereby corrected as shown below:

Title page:

item [30] Foreign Application Priority Data, "30982" should read --309382--.

Signed and Sealed this

First Day of July, 1997

Attest:

BRUCE LEHMAN

*Attesting Officer*  *Commissioner of Patents and Trademarks*